US011802081B2

(12) United States Patent
Skorina et al.

(10) Patent No.: US 11,802,081 B2
(45) Date of Patent: Oct. 31, 2023

(54) GRANULES

(71) Applicant: 3M INNOVATIVE PROPERTIES COMPANY, St. Paul, MN (US)

(72) Inventors: Taisiya Skorina, Woodbury, MN (US); Anatoly Z. Rosenflanz, Maplewood, MN (US); Jean A. Tangeman, Minneapolis, MN (US); Kenton D. Budd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 82 days.

(21) Appl. No.: 16/300,296

(22) PCT Filed: May 11, 2017

(86) PCT No.: PCT/US2017/032209
§ 371 (c)(1),
(2) Date: Nov. 9, 2018

(87) PCT Pub. No.: WO2017/200844
PCT Pub. Date: Nov. 23, 2017

(65) Prior Publication Data
US 2019/0144335 A1 May 16, 2019

Related U.S. Application Data

(60) Provisional application No. 62/336,988, filed on May 16, 2016, provisional application No. 62/336,995, filed on May 16, 2016.

(51) Int. Cl.
*C04B 18/02* (2006.01)
*C04B 14/30* (2006.01)
(Continued)

(52) U.S. Cl.
CPC .......... *C04B 18/021* (2013.01); *C04B 14/043* (2013.01); *C04B 14/28* (2013.01);
(Continued)

(58) Field of Classification Search
CPC ... C04B 14/04; C04B 14/041; C04B 2103/54; C04B 22/16; C04B 24/20; C04B 7/02;
(Continued)

(56) References Cited

U.S. PATENT DOCUMENTS 2,547,042 A   4/1951  Pole
6,372,694 B1  4/2002  Osinga
(Continued)

FOREIGN PATENT DOCUMENTS

CA   2 800 585    6/2013
CA   2 871 737    11/2013
(Continued)

OTHER PUBLICATIONS

Levinson, R. et al..; "A novel technique for the production of cool colored concrete tile and asphalt shingle roofing products"; Solar Energy Materials & Solar Cells; vol. 94; 2010; pp. 946-954.

*Primary Examiner* — Shuangyi Abu Ali
(74) *Attorney, Agent, or Firm* — Jonathan V. Sry (57) ABSTRACT

A plurality of granules comprising ceramic particles bound together with an inorganic binder, the inorganic binder comprising reaction product of at least alkali silicate and hardener, wherein the ceramic particles are present as at least 50 percent by weight of each granule, based on the total weight of the respective granule, wherein each granule has a total porosity in a range from greater than 0 to 50 percent by volume, based on the total volume of the respective granule, and wherein the granule has a minimum Total Solar Reflectance of at least 0.7. The granules are useful, for example, as roofing granules.

24 Claims, 2 Drawing Sheets

(51) Int. Cl.
*C04B 14/04* (2006.01)
*C04B 14/28* (2006.01)
*C04B 38/00* (2006.01)
*E04D 7/00* (2006.01)
*C04B 111/00* (2006.01)
*E04D 1/00* (2006.01)

(52) U.S. Cl.
CPC .......... *C04B 14/303* (2013.01); *C04B 14/305* (2013.01); *C04B 38/009* (2013.01); *E04D 7/005* (2013.01); *C04B 2111/00586* (2013.01); *E04D 1/00* (2013.01); *E04D 2001/005* (2013.01)

(58) Field of Classification Search
CPC ... C04B 18/021; C04B 38/009; C04B 18/027; C04B 28/26; C04B 38/0074; C04B 14/043; C04B 14/28; C04B 14/303; C04B 14/305; C04B 2111/00586; E04D 1/00; E04D 2001/005; E04D 7/005; Y02W 30/91
See application file for complete search history.

(56) References Cited

U.S. PATENT DOCUMENTS

| | | | |
|---|---|---|---|
| 7,388,063 | B2 | 6/2008 | Zanghellini |
| 8,142,531 | B2 | 3/2012 | Adefris et al. |
| 8,637,116 | B2 | 1/2014 | Shiao et al. |
| 2004/0258835 | A1 | 12/2004 | Hong |
| 2010/0151199 | A1 | 6/2010 | Shiao et al. |
| 2010/0203336 | A1* | 8/2010 | Shiao ................. C04B 35/6316 428/404 |
| 2013/0004713 | A1 | 1/2013 | Zhu |
| 2014/0248467 | A1 | 9/2014 | Shiao et al. |
| 2015/0192698 | A1* | 7/2015 | Joedicke ............... C04B 38/009 52/747.1 |

FOREIGN PATENT DOCUMENTS

| | | |
|---|---|---|
| CA | 2 876 893 | 12/2013 |
| CA | 2 545 903 | 2/2015 |
| WO | WO 2008/147971 | 12/2008 |
| WO | WO 2008/147972 | 12/2008 |
| WO | WO 2009/145968 | 12/2009 |
| WO | WO 2010/091326 | 8/2010 |
| WO | WO 2013/192336 | 12/2013 |
| WO | WO 2014/042987 | 3/2014 |
| WO | WO 2014/042988 | 3/2014 |
| WO | WO 2014/043212 | 3/2014 |
| WO | WO 2015/112590 | 7/2015 |
| WO | WO 2015/157612 | 10/2015 |
| WO | WO 2015/157615 | 10/2015 |
| WO | WO 2017/200843 | 11/2017 |

\* cited by examiner

GRANULES

CROSS REFERENCE TO RELATED APPLICATIONS

This application is a national stage filing under 35 U.S.C. 371 of PCT/US2017/032209, filed May 11, 2017, which claims the benefit of U.S. Provisional Application Nos. 62/336,995, filed May 16, 2016 and 62/336,988, filed May 16, 2016, the disclosures of which are incorporated by reference in their entireties herein.

BACKGROUND

Conventional roofing granules typically have a core baserock of dacite, nepheline syenite, rhyolite, andesite, etc., coated with at least one layer of pigment-containing material. A typical coating is composed of sodium silicate mixed with raw clay and a pigmenting oxide. Energy efficient shingles are designed to have improved solar reflectivity. Titania pigmented standard white granules are known, but total reflectance of these pigments is limited by absorbance of the base rock (conventional pigment layers do not completely "hide" the underlying base), and by absorbance in the binder system by components such as the clay.

SUMMARY

In one aspect, the present disclosure describes a plurality of granules comprising ceramic particles bound together with an inorganic binder, the inorganic binder comprising reaction product of at least alkali silicate and hardener (in some embodiments further comprising alkali silicate itself), wherein the ceramic particles are present as at least 50, 55, 60, 65, 70, 75, 80, or even at least 85 (in some embodiments, in a range from 50 to 85, or even 60 to 85) percent by weight of each granule, based on the total weight of the respective granule, wherein each granule has a total porosity in a range from greater than 0 to 50, 5 to 50, 20 to 50, or even 20 to 40 percent by volume, based on the total volume of the respective granule, and wherein the granule has a minimum Total Solar Reflectance (as determined by the Total Solar Reflectance Test described in the Examples) of at least 0.7 (in some embodiments, at least 0.75, or even at least 0.8. In some embodiments, each granule collectively comprises at least 80 (in some embodiments, at least 85, 90, or even at least 95; in some embodiments, in a range from 80 to 95) percent by weight collectively of the ceramic particles and reaction product of the alkali silicate and the hardener, based on the total weight of the respective granule. In some embodiments, each granule collectively comprises at least 80 (in some embodiments, at least 85, 90, or even at least 95; in some embodiments, in a range from 80 to 95) percent by weight collectively of the ceramic particles, alkali silicate, and reaction product of the alkali silicate and the hardener, based on the total weight of the respective granule.

In this application:

"amorphous" refers to material that lacks any long range crystal structure, as determined by the X-ray diffraction technique described in the Examples;

"ceramic" includes amorphous material, glass, crystalline ceramic, glass-ceramic, and combinations thereof;

"functional additive" refers to a material that substantially changes at least one property (e.g., durability and resistance to weathering) of a granule when present in an amount not greater than 10 percent by weight of the granule;

"glass" refers to amorphous material exhibiting a glass transition temperature;

"glass-ceramic" refers to ceramics comprising crystals formed by heat-treating amorphous material;

"hardener" refers to a material that initiates and/or enhances hardening of an aqueous silicate solution; hardening implies polycondensation of dissolved silica into three-dimensional Si—O—Si(Al) bond network and/or crystallization of new phases; in some embodiments, the granules comprise excess hardener.

"inorganic" refers to compounds that are not organic (broadly, compounds not essentially comprised of carbon, hydrogen and nitrogen);

"mineral" refers to a solid inorganic substance of natural occurrence; and

"partially crystallized" refers to material containing a component characterized by long range order.

In another aspect, the present disclosure describes a method of making the plurality of granules described herein, the method comprising:

curing an aqueous dispersion comprising ceramic particles, alkali silicate precursor, and hardener to provide cured material; and crushing the cured material to provide the granules. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C.

In another aspect, the present disclosure describes a method of making the plurality of granules described herein, the method comprising:

mixing material comprising ceramic particles, alkali silicate precursor, and hardener to provide agglomerates comprising ceramic particles, alkali silicate precursor, and hardener; and curing the agglomerates to provide the granules. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C.

In another aspect, the present disclosure describes a method of making the plurality of granules described herein, the method comprising:

spray drying an aqueous dispersion comprising ceramic particles, alkali silicate precursor, and hardener to provide agglomerates comprising ceramic particles, alkali silicate precursor, and hardener; and curing the agglomerates to provide the granules. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C.

In another aspect, the present disclosure describes a method of making the plurality of granules described herein, the method comprising:

providing an aqueous dispersion in a tool comprising a plurality of cavities, the aqueous dispersion comprising ceramic particles, alkali silicate, and hardener; and curing the aqueous dispersion in a tool to provide the granules. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C.

Advantages of embodiments of granules described herein may include enhanced solar reflectance, density control, and size/shape control.

Granules described herein are useful for example, as roofing granules.

DETAILED DESCRIPTION

Suitable alkali silicates include cesium silicate, lithium silicate, a potassium silicate, or a sodium silicate. Exemplary alkali silicates can be obtained from commercial sources such as PQ Corporation Malvern, Pa.

Exemplary hardeners include an aluminum phosphate, an aluminosilicate (e.g., amorphous aluminosilicate), a fluorosilicate, Portland cement, a cryolite, a calcium salt (e.g., $CaCl_2$)), and a calcium silicate. In some embodiments, the hardener is at least one of aluminum phosphate, amorphous aluminosilicate, fluorosilicate, Portland cement, or a calcium silicate. In some embodiments, the hardener is amorphous. In some embodiments, the hardener includes amorphous aluminosilicate. Exemplary hardeners can be obtained from commercial sources such as Budenheim, Inc., Budenheim, Germany, and Solvay Fluorides, LLC, Houston, Tex.

In some embodiments, the inorganic binder is present as at least 5, 10, 15, 20, 25, 30, 35, 40, or 45, or even up to 50 (in some embodiments, in a range from 5 to 50, 10 to 50, or even 25 to 50) percent by weight of each granule, based on the total weight of the respective granule. In some embodiments, the ratio of alkali silicate to hardener is in a range from 20:1 to 2:1.

In some embodiments, the ceramic particles comprise at least one component with Total Solar Reflectance (as determined by the Total Solar Reflectance Test described in the Examples) of at least 0.75, or even at least 0.8. Such exemplary ceramic particles include aluminum hydroxide (calcined and uncalcined), metal or metalloid oxide (e.g., silica (e.g., crystoballite, quartz, etc.), an aluminate (e.g., alumina, mullite, etc.), a titanate (e.g., titania), and zirconia), a silicate glass (e.g., soda-lime-silica glass, a borosilicate glass), porcelain, or marble. In some embodiments, the ceramic particles comprise minerals. Exemplary ceramic particles can be made by techniques known in the art and/or obtained from commercial sources such as Vanderbilt Minerals, LLC, Norwalk, Conn.; DADCO, Lausanne, Switzerland; and American Talc Company, Allamoore, Tex.

In some embodiments, the ceramic particles of each granule comprises no more than 10 (in some embodiments, no greater than 5, 4, 3, 2, 1, or even zero) percent by weight, on a theoretical oxides basis, $TiO_2$ based on the total weight of the granule for the respective granule. In some embodiments, the ceramic particles of each granule comprises no more than 10 (in some embodiments, no greater than 5, 4, 3, 2, 1, or even zero) percent by weight pure $TiO_2$, based on the total weight of the granule for the respective granule. In some embodiments, the ceramic particles of each granule comprises no more than 10 (in some embodiments, no greater than 5, 4, 3, 2, 1, or even zero) percent by weight pure $Al_2O_3$, based on the total weight of the granule for the respective granule.

In some embodiments, the ceramic particles have an average particle size in a range from 200 nanometers to 200 micrometers, 200 nanometers to 100 micrometers, 250 nanometers to 50 micrometers, 500 nanometers to 2 micrometers, 2 micrometers to 5 micrometers, or even 5 micrometers to 20 micrometers. In some embodiments, the ceramic particles have a bimodal distribution of sizes.

In some embodiments, the ceramic particles each have a longest dimension, wherein the granules each have a longest dimension, and wherein the longest dimension of each ceramic particle for a given granule is no greater than 20% (in some embodiments, no greater than 25%) of the diameter of said given granule.

In some embodiments, the granules further comprise at least one of a functional additive (e.g., rheology modifier, durability modifier, and fluxing agent), organic binder, or pigment. Exemplary rheology modifiers include surfactants. Exemplary durability modifiers include nanosilica, pyrogenic ("fumed") silica, and silica fume, which are available, for example, from Evonik Industries, Essen, Germany.

Exemplary fluxing agents include borax, which is available, for example, from Rio Tinto Minerals, Boron, Calif. Exemplary organic binders include dextrin and carboxymethylcellulose, which are available, for example, from Dow Chemical Company, Midland, Mich.

Embodiments of granules described herein can be made by a variety of methods. For example, one method comprises:

curing an aqueous dispersion comprising ceramic particles, alkali silicate precursor, and hardener to provide cured material; and crushing the cured material to provide the granules.

The dispersion can be prepared using techniques known in the art. In some embodiments, water is present in the aqueous dispersion up to 75 (in some embodiments, up to 70, 65, 60, 55, 50, 45, 40, 35, 30, 25, 20, or even up to 15 (in some embodiments; in a range from 15 to 75, 15 to 50, or even 15 to 35) percent by weight, based on the total weight of the aqueous dispersion.

The aqueous dispersion can be cured by techniques known in the art, including heating the dispersion in an oven. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min. The selection of the heating rate(s) and temperature(s) may be influenced by the composition and/or size of the materials being cured.

Techniques for crushing and screening the cured material to provide the desired size and particle size distribution of granules are known in the art.

A second method comprises:

mixing material comprising ceramic particles, alkali silicate precursor, and hardener to provide agglomerates comprising ceramic particles, alkali silicate precursor, and hardener; and curing the agglomerates to provide the granules.

The material can be mixed using techniques known in the art for agglomerating material.

Typically, a liquid such as water is introduced (periodically or continually) to aid in agglomerating the material.

In some embodiments, the material is an aqueous dispersion, which can be made using techniques known in the art. In some embodiments, water is present in up to 75, 70, 65, 60, 55, 50, 45, 40, 35, 30, 25, 20, or even up to 15 (in some embodiments; in a range from 15 to 75, 15 to 50, or even 15 to 35) percent by weight, based on the total weight of the aqueous dispersion.

Curing can be done by techniques known in the art, including heating the material to be cured in an oven. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min. The selection of the heating rate(s) and temperature(s) may be influenced by the composition and/or size of the materials being cured.

A third method comprises:

spray drying an aqueous dispersion comprising ceramic particles, alkali silicate precursor, and hardener to provide agglomerates comprising ceramic particles, alkali silicate precursor, and hardener;

and curing the agglomerates to provide the granules.

The dispersion can be prepared using techniques known in the art. In some embodiments, water is present in the aqueous dispersion up to 75, 70, 65, 60, 55, 50, 45, 40, 35, 30, 25, 20, or even up to 15 (in some embodiments, in a range from 15 to 75, 15 to 50, or even 15 to 35) percent by weight, based on the total weight of the aqueous dispersion.

The agglomerates can be cured by techniques known in the art, including curing in a batch oven or continuous rotary furnace. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min. The selection of the heating rate(s) and temperature(s) may be influenced by the composition and/or size of the materials being cured.

A fourth method comprises:

providing an aqueous dispersion in a tool comprising a plurality of cavities, the aqueous dispersion comprising ceramic particles, alkali silicate, and hardener; and curing the aqueous dispersion in a tool to provide the granules.

The dispersion can be prepared using techniques known in the art. In some embodiments, water is present in the aqueous dispersion up to 75, 70, 65, 60, 55, 50, 45, 40, 35, 30, 25, 20, or even up to 15 (in some embodiments; in a range from 15 to 75, 15 to 50, or even 15 to 35) percent by weight, based on the total weight of the aqueous dispersion.

The tool can be a mold having at least one mold cavity, more typically a plurality of cavities. The cavity can be configured to have the desired three-dimensional shape. In one exemplary embodiment, the shape of a cavity can be described as being a triangle as viewed from the top. Other exemplary cavity shapes include circles, rectangles, squares, hexagons, stars, etc., to provide shapes such as cubes, truncated cubes, pyramids, truncated pyramids, triangles, tetrahedra, spheres, hemispheres, cones and combinations thereof. The shapes typically have a substantially uniform depth dimension. Such molds can be made using techniques known in the art, including that reported in U.S. Pat. No. 8,142,531 (Adefris et al.), the disclosure of which is incorporated herein by reference.

Curing can be conducted using techniques known in the art, including heating the tool with the dispersion in the cavities in an oven. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min. The selection of the heating rate(s) and temperature(s) may be influenced by the composition and/or size of the materials being cured.

In some embodiments, the granules have particle sizes in a range from 25 micrometers to 5 millimeters, 50 micrometers to 1 millimeter, 100 micrometers to 500 micrometers, 200 micrometers to 500 micrometers; 500 micrometers to 2 millimeters; or even 2 millimeters to 5 millimeters.

In some embodiments, the inorganic binder is amorphous. In some embodiments, the inorganic binder is partially crystallized.

In some embodiments, the granules have a density in a range from 0.5 g/cm$^3$ to 3.0 g/cm$^3$.

In some embodiments, the granules have an as-cured outer surface (i.e., the granules have the surface as-made, as opposed being granules obtained by crushing).

The granules may be in any of a variety of shapes, including cubes, truncated cubes, pyramids, truncated pyramids, triangles, tetrahedra, spheres, hemispheres, and cones. In some embodiments, a granule can have a first face and a second face separated by a thickness. In some embodiments, such granules further comprise at least one of a straight or sloping wall.

In some embodiments, granules described herein have a Tumble Toughness Value (as determined by the Tumble Toughness Value Test described in the Examples) of least 70, 75, 80, 85, 90, 95, 96, 97, 98, or even at least 99 before immersion in water, and at least 50, 55, 60, 65, 70, 75, 80, 85 or even at least 90 after 2 months immersion in water at 20° C.±2° C.

In some embodiments, the granules have a Stain Value (as determined by the Stain Value Test described in the Examples) not greater than 15 (in some embodiments, not greater than 10, 5, 4, 3, 2, 1, or even not greater than 0.1).

Granules described herein are useful, for example, as roofing granules. For example, granules described herein can be used to make roofing material comprising a substrate and the granules thereon. In some embodiments, the roofing material has a total solar reflectance of at least 0.7.

Advantages of embodiments of granules described herein may include enhanced solar reflectance, and light weight, as compared with standard roofing granules.

Exemplary Embodiments

1A. A plurality of granules comprising ceramic particles bound together with an inorganic binder, the inorganic binder comprising reaction product of at least alkali silicate and hardener (in some embodiments further comprising alkali silicate itself), wherein the ceramic particles are present as at least 50 (in some embodiments, at least 55, 60, 65, 70, 75, 80, or even at least 85; in some embodiments, in a range from 50 to 85, or even 60 to 85) percent by weight of each granule, based on the total weight of the respective granule, wherein each granule has a total porosity in a range from greater than 0 to 50 (in some embodiments, in a range from 5 to 50, 20 to 50, or even 20 to 40) percent by volume, based on the total volume of the respective granule, and wherein the granule has a minimum Total Solar Reflectance of at least 0.7 (in some embodiments, of at least 0.75, or even at least 0.8).

2A. The plurality of granules of Exemplary Embodiment 1A, wherein each granule collectively comprises at least 80 (in some embodiments, at least 85, 90, or even at least 95; in some embodiments, in a range from 80 to 95) percent by weight collectively of the ceramic particles and reaction product of the alkali silicate and the hardener, based on the total weight of the respective granule.

3A. The plurality of granules of Exemplary Embodiment 1A, wherein each granule collectively comprises at least 80 (in some embodiments, at least 85, 90, or even at least 95; in some embodiments, in a range from 80 to 95) percent by weight collectively of the ceramic particles, alkali silicate, and reaction product of the alkali silicate and the hardener, based on the total weight of the respective granule.

4A. The plurality of granules of any preceding A Exemplary Embodiment, wherein the ceramic particles each have a longest dimension, wherein the granules each have a longest dimension, and wherein the longest dimension of each ceramic particle for a given granule is no greater than 20% (in some embodiments, no greater than 25%) of the diameter of said given granule.

5A. The plurality of granules of any preceding A Exemplary Embodiment, wherein the ceramic particles of each granule comprises no more than 10 (in some embodiments, no greater than 5, 4, 3, 2, 1, or even zero) percent by weight pure $TiO_2$, based on the total weight of the granule for the respective granule.

6A. The plurality of granules of any of Exemplary Embodiments 1A to 4A, wherein the ceramic particles of each granule comprises no more than 10 (in some embodiments, no greater than 5, 4, 3, 2, 1, or even zero) percent by weight, on a theoretical oxides basis, $TiO_2$, based on the total weight of the granule for the respective granule.

7A. The plurality of granules of any preceding A Exemplary Embodiment, wherein the ceramic particles of each granule comprises no more than 10 (in some embodiments, no greater than 5, 4, 3, 2, 1, or even zero) percent by weight pure $Al_2O_3$, based on the total weight of the granule for the respective granule.

8A. The plurality of granules of any preceding A Exemplary Embodiment, wherein the granules have a Tumble Toughness Value of least 70 (in some embodiments, at least 75, 80, 85, 90, 95, 96, 97, 98, or even at least 99) before immersion in water and at least 50 (in some embodiments, at least 55, 60, 65, 70, 75, 80, 85 or even at least 90) after immersion in water at 20° C.±2° C. for two months.

9A. The plurality of granules of any preceding A Exemplary Embodiment, wherein the inorganic binder is present as at least 5 (in some embodiments, at least 10, 15, 20, 25, 30, 35, 40, or 45, or even up to 50; in some embodiments, in a range from 5 to 50, 10 to 50, or even 25 to 50) percent by weight of each granule, based on the total weight of the respective granule.

10A. The plurality of granules of any preceding A Exemplary Embodiment, wherein the granules have particle sizes in a range from 25 micrometers to 5 millimeters (in some embodiments, 50 micrometers to 1 millimeter, 100 micrometers to 500 micrometers, 200 micrometers to 500 micrometers; 500 micrometers to 2 millimeters; or even 2 millimeters to 5 millimeters).

11A. The plurality of granules of any preceding A Exemplary Embodiment, wherein the ceramic particles have an average particle size in a range from 200 nanometers to 200 micrometers (in some embodiments, 200 nanometers to 100 micrometers, 250 nanometers to 50 micrometers, 500 nanometers to 2 micrometers, 2 micrometers to 5 micrometers, or even 5 micrometers to 20 micrometers).

12A. The plurality of granules of any preceding A Exemplary Embodiment, wherein the ceramic particles have a bimodal distribution of sizes.

13A. The plurality of granules of any preceding A Exemplary Embodiment, wherein the inorganic binder is amorphous.

14A. The plurality of granules of any of Exemplary Embodiments 1A to 11A, wherein the inorganic binder is partially crystallized.

15A. The plurality of granules of any preceding A Exemplary Embodiment, wherein the alkali silicate is at least one of a cesium silicate, lithium silicate, a potassium silicate, or a sodium silicate.

16A. The plurality of granules of any preceding A Exemplary Embodiment, wherein the hardener is amorphous.

17A. The plurality of granules of any preceding A Exemplary Embodiment, wherein the hardener is at least one of aluminum phosphate, amorphous aluminosilicate, fluorosilicate, Portland cement, or a calcium silicate.

18A. The plurality of granules of any preceding A Exemplary Embodiment, wherein the hardener is at least one of an aluminum phosphate, an aluminosilicate, a fluorosilicate, Portland cement, a cryolite, a calcium salt (e.g., $CaCl_2$)), or a calcium silicate.

19A. The plurality of granules of any preceding A Exemplary Embodiment, wherein the ceramic particles comprise at least one component with Total Solar Reflectance (as determined by the Total Solar Reflectance Test described in the Examples) of at least 0.7. Such exemplary ceramic particles include aluminum hydroxide, metal or metalloid oxide (e.g., silica (e.g., crystoballite, quartz, etc.), an aluminate (e.g., alumina, mullite, etc.), a titanate (e.g., titania), and zirconia), a silicate glass (e.g., soda-lime-silica glass, a borosilicate glass), porcelain, or marble.

20A. The plurality of granules of any preceding A Exemplary Embodiment, wherein the ceramic particles comprise mineral.

21A. The plurality of granules of any preceding A Exemplary Embodiment, wherein the granules further comprise at least one of a functional additive (e.g., rheology modifier (e.g., surfactant), durability modifier (e.g., nanosilica), and fluxing agent), organic binder, or pigment.

22A. The plurality of granules of any preceding A Exemplary Embodiment, wherein each respective granule has a density in a range from 0.5 g/cm$^3$ to 3.0 g/cm$^3$.

23A. The plurality of granules of any preceding A Exemplary Embodiment, wherein the granules have an as-cured outer surface.

24A. The plurality of granules of any preceding A Exemplary Embodiment, wherein the granules are in at least one of the following shapes: cubes, truncated cubes, pyramids, truncated pyramids, triangles, tetrahedra, spheres, hemispheres, or cones.

25A. The plurality of granules of any preceding A Exemplary Embodiment, wherein each granule has a first face and a second face separated by a thickness.

26A. The plurality of granules of Exemplary Embodiment 23A, wherein at least some granules further comprise at least one of a straight or sloping wall.

27A. The plurality of granules of any preceding A Exemplary Embodiment, wherein the granules have a Stain Value not greater than 15 (in some embodiments, not greater than 10, 5, 4, 3, 2, 1, or even not greater than 0.5).

28A. A roof comprising the plurality of granules of any preceding A Exemplary Embodiment.

29A. A roofing material comprising a substrate and granules of any of Exemplary Embodiments 1A to 27A (in some embodiments, the roofing material has a total solar reflectance of at least 0.7).

1B. A method of making the plurality of granules of any of Exemplary Embodiments 1A to 27A, the method comprising:
curing an aqueous dispersion comprising ceramic particles, alkali silicate precursor, and hardener to provide cured material; and
crushing the cured material to provide the granules.

2B. The method of Exemplary Embodiment 1B, wherein the curing is conducted at least in part at a temperature in a range from 40° C. to 500° C. (in some embodiments, in a range from 50° C. to 450° C., 50° C. to 350° C., 50° C. to 250° C., 50° C. to 200° C., 50° C. to 150° C., 50° C. to 100° C., or even 50° C. to 80° C.). In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min.

3B. The method of any preceding B Exemplary Embodiment, wherein water is present in the aqueous dispersion up to 75 (in some embodiments, up to 70, 65, 60, 55, 50, 45, 40, 35, 30, 25, 20, or even up to 15; in some embodiments, in a range from 15 to 75, 15 to 50, or even 15 to 35) percent by weight, based on the total weight of the aqueous dispersion.

1C. A method of making the plurality of granules of any of Exemplary Embodiments 1A to 27A, the method comprising:
mixing material comprising ceramic particles, alkali silicate precursor, and hardener to provide agglomerates comprising ceramic particles, alkali silicate precursor, and hardener; and
curing the agglomerates to provide the granules.

2C. The method of Exemplary Embodiment 1C, wherein the material is an aqueous dispersion.

3C. The method of any preceding C Exemplary Embodiment, wherein water is added to the material during mixing.

4C. The method of any preceding C Exemplary Embodiment, wherein the curing is conducted at least in part at a temperature in a range from 40° C. to 500° C. (in some embodiments, in a range from 50° C. to 450° C., 50° C. to 350° C., 50° C. to 250° C., 50° C. to 200° C., 50° C. to 150° C., 50° C. to 100° C., or even 50° C. to 80° C.). In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min.

5C. The method of any preceding C Exemplary Embodiment, wherein water is present in up to 75 (in some embodiments, up to 70, 65, 60, 55, 50, 45, 40, 35, 30, 25, 20, or even up to 15; in some embodiments, in a range from 15 to 75, 15 to 50, or even 15 to 35) percent by weight, based on the total weight of the aqueous dispersion.

1D. A method of making the plurality of granules of any of Exemplary Embodiments 1A to 27A, the method comprising:
spray drying an aqueous dispersion comprising ceramic particles, alkali silicate precursor, and hardener to provide agglomerates comprising ceramic particles, alkali silicate precursor, and hardener; and
curing the agglomerates to provide the granules.

2D. The method of Exemplary Embodiment 1D, wherein the curing is conducted at least in part at a temperature in a range from 40° C. to 500° C. (in some embodiments, in a range from 50° C. to 450° C., 50° C. to 350° C., 50° C. to 250° C., 50° C. to 200° C., 50° C. to 150° C., 50° C. to 100° C., or even 50° C. to 80° C.). In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min.

3D. The method of any preceding D Exemplary Embodiment, wherein water is present in the aqueous dispersion up to 75 (in some embodiments, up to 70, 65, 60, 55, 50, 45, 40, 35, 30, 25, 20, or even up to 15; in some embodiments, in a range from 15 to 75, 15 to 50, or even 15 to 35) percent by weight, based on the total weight of the aqueous dispersion.

1E. A method of making the plurality of granules of any of Exemplary Embodiments 1A to 27A, the method comprising:
providing an aqueous dispersion in a tool comprising a plurality of cavities, the aqueous dispersion comprising ceramic particles, alkali silicate precursor, and hardener; and
curing the aqueous dispersion in a tool to provide the granules.

2E. The method of Exemplary Embodiment 1E, wherein the curing is conducted at least in part at a temperature in a range from 40° C. to 500° C. (in some embodiments, in a range from 50° C. to 450° C., 50° C. to 350° C., 50° C. to 250° C., 50° C. to 200° C., 50° C. to 150° C., 50° C. to 100° C., or even 50° C. to 80° C.). In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min.

3E. The method of any preceding E Exemplary Embodiment, wherein water is present in the aqueous dispersion up to 75, (in some embodiments, up to 70, 65, 60, 55, 50, 45, 40, 35, 30, 25, 20, or even up to 15; in some embodiments, in a range from 15 to 75, 15 to 50, or even 15 to 35) percent by weight, based on the total weight of the aqueous dispersion.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Materials

TABLE 1

| Material | Description | Source |
| --- | --- | --- |
| LITHISIL 829 | Potassium lithium silicate solution in water, wt. ratio $SiO_2/K_2O + Li_2O = 2.5$ | PQ Corporation, Malvern, PA, under the trade designation "LITHISIL829" |
| BW50 | Sodium silicate solution in water, wt. ratio $SiO_2/Na_2O = 1.6$ | PQ Corporation, under the trade designation "BW50" |
| STAR | Sodium silicate solution in water, wt. ratio $SiO_2/Na_2O = 2.5$ | PQ Corporation, under the trade designation "STAR" |
| Sodium Fluorosilicate | $Na_2SiF_6$, hardener | Alfa Aesar, Haverhill, MA |
| FABUTIT F758 | Aluminum phosphate, hardener, $P_2O_5 = 78$ wt. %, $Al_2O_3 = 21$ wt. % | Budenheim, Inc., Budenheim, Germany, under trade the designation "FABUTIT F758" |
| OPTIPOZZ | Reactive metakaolin, (anhydrous amorphous aluminosilicate) | Burgers Pigment Company, Sandersville, GA, under the trade designation "OPTIPOZZ" |
| OPIWHITE | Mullite, filler, opacity provider anhydrous crystalline aluminosilicate | Burgers Pigment Company, under the trade designation "OPIWHITE" |
| VANSIL W50 | Wollastonite, $CaSiO_3$, structural filler | Vanderbilt Minerals LLC, Norwalk, CT, under the trade designation "VANSIL W50" |
| ATH SH 20 | Alumina trihydrate, color extender calcined at 700° C. | DADCO, Lausanne, Switzerland, under the trade designation "ATH SH 20" |
| CaCO3#10 | Calcium carbonate, filler | Imerys, Inc., Cockeysville, MD |
| $TiO_2$ | Pigment | Alfa Aesar |
| ZnO | Pigment | |

Methods
General Method I for Making Granules

Granules were made generally as follows, with further specifics provided in the Examples below: First, structural filler ("VANSIL W50"), color extender ("ATH SH20") were homogenized by ball milling. Next, hardener was added into the liquid silicate and stirred vigorously for 10 minutes. Homogenized dry part was combined with the liquid part and stirred at 1000 rpm for 15 minutes. Slurry was cast into triangular mold cavities of 0.42 mm depth and 1.693 mm on each side, with 98 degree draft angle. Casted granules were subjected to two-stage curing.

General Method II for Making Granules

Granules were formed in a tumble agglomerator (Eirich mixer, obtained from Maschinenfabrik Gustav Eirich GmbH & Co., Hardheim, Germany). The liquid part, comprising liquid sodium silicate, and the color extender ("ATH SH 20") were co-milled with hardener and wollastonite. The resulting green granules were cured as described in "General Method I For Making Granules." After curing, the granules were sieved and the fraction between 600-1000 micrometers retained.

General Method III for Making Granules

Granules were made generally as follows, with further specifics provided in the Examples below: First, structural filler ("CaCO3#10") and color extender ("OPIWHITE") were mixed together. Next, the hardener ("OPTIPOZZ") was combined with liquid silicate ("STAR") and additional water and stirred vigorously for 10 minutes. Homogenized dry part was combined with the liquid part and stirred at 1000 rpm for 15 minutes. Slurry was cast into a pan and crushed into particles after first stage of curing (EX4). For EX4, 425 micrometer-2000 micrometer fraction was screened and used for further second stage curing and evaluation. All granules were subjected to two-stage curing.

Method for Determining Reflectivity

The Examples were tested for reflectivity using a spectrum reflectometer (obtained as Model SSR-ER v6 from Devices and Services Co., Dallas, Tex.) using a 1.5E air mass setting. For "Cup" measurements, granules were loaded into a sample holder with a depth of approximately 5 mm. The surface of the granules was leveled using a roller.

Method for Determining Granule Tumble Toughness

Granule Tumble Toughness Values (wt. %) were determined before and after 2 month immersion in water using the Abrasion Resistance Test Roofing Procedure from the Asphalt Roofing Manufacturers Association (ARMA) Granule Test Procedures Manual, ARMA Form No. 441-REG-96, the disclosure of which is incorporated herein by reference. More specifically, a 125 gram sample was placed on the sieve shaker (obtained under the trade designation "RX-29 RO-TAP" (W.S. Tyler Industrial Group, Mentor, Ohio)) and agitated for 10 minutes to ensure complete removal of the material finer than the mesh corresponding to the original diameter of the smallest fraction of the granules distribution (100 Mesh). 100 grams of the granules were weighed and placed them inside the 5.1 cm (2 inch) diameter pipe tester. The pipe was rotated by turning it end for end 100 times, controlling rate of rotation so that the granules drop cleanly without sliding. At the end of the test, the top cap was unscrewed, the pipe was turned over, the contents emptied into the sieve, and the pan placed in the sieve shaker ("RO-TAP") and run for 5 minutes.

The Tumble Toughness Values, before and after immersion in water at 20° C.±2° C., are reported as the percent by weight of the material remaining on the sieve with mesh corresponding to the original diameter of the smallest fraction of the granules distribution (100 mesh).

Method for Stain Resistance Test

A four-day stain test was an accelerated measurement of the tendency of roofing granules to adsorb asphaltic oils in an asphalt-based substrate carried out in accordance with the procedure described in PCT Pub. No. WO2010/091326 A2, published Aug. 12, 2010, the disclosure of which is incorporated herein by reference. More specifically, the granules of each sample were partially embedded in asphalt that had been heated to 180° C. The partially embedded granules were placed on a tray in an oven at 80° C. for 96 hours (4 days). The trays were removed from the oven, and the asphalt allowed to cool to room temperature.

The granules on the asphalt substrate were then measured for staining under a colorimeter (obtained under the trade designation "LABSCAN" from HunterLab, Reston, Va.) and a staining value calculated. Stain was measured by the total change in color measured in CIELAB (L*a*b*) units, delta E, of the unexposed and the four-day heat exposed granules. Stain Value=$\Delta E^* = [(L^*4\text{-day} - L^*0\text{-day})^2 + (a^*4\text{-day} - a^*0\text{-day})^2 + (b^*4\text{-day} - b^*0\text{-day})2]^{1/2}$. A higher stain value represented a greater change in color, which was undesired.

Method for Determining Crystallinity

Crystal structure and phase transformation were studied by powder x-ray diffraction (XRD) using an x-ray diffractometer (obtained under the trade designation ("RIGAKU MINI FLEXII" from Rigaku Americas, The Woodlands, Tex.)) with CuKα radiation (1.54 Å) over the 2θ range of 20 to 80.

Method for Determining Porosity

The Brunauer, Emmett and Teller (BET) surface area and total pore volume were determined by $N_2$ adsorption. More specifically, samples were characterized by $N_2$ adsorption at 77° K using a gas sorption analyzer (obtained under the trade designation "MICROMERITICS;" Model ASAP-2020 from Micromeritics Instruments, Norcross, Ga.). Each specimen was outgassed for 24 hours at 573° K to remove any moisture or adsorbed contaminants that may have been present on the surface. The mean pore diameter, $D_p$, was calculated from $D_p = 4V_t/S$, where $V_t$ is the total volume of pores, and S being the BET surface area.

Examples 1-4 (EX1-EX4) and Comparative Example A (CE-A)

EX1 and EX2 were prepared as described in "General Method I For Making Granules." EX3 was prepared as described in "General Method II For Making Granules." EX4 was prepared as described in "General Method III For Making Granules." The composition and processing parameters of each of EX1-EX4 are summarized in Table 2, below.

TABLE 2

| Component | EX1 | EX2 | EX3 | EX4 |
|---|---|---|---|---|
| LITHISIL 829 | 0 | 33.7 | 0 | 0 |
| BW50 | 32.71 | 0 | 25.3 | 0 |
| STAR | | | | 18.8 |
| $Na_2SiF_6$ | 5.61 | 0 | 0 | 0 |
| OPTIPOZZ | | | | 7 |
| VANSIL W50 | 18.69 | 11.2 | 12.6 | 0 |
| FABUTIT F758 | 0 | 4.5 | 4.5 | 0 |
| ATH | 37.38 | 45 | 50.6 | 0 |
| OPTIWHITE | 0 | 0 | 0 | 20.3 |
| CaCO3#10 | 0 | 0 | 0 | 15.8 |
| $TiO_2$ | 0 | 5.61 | 6.32 | 0 |
| ZnO | 5.6 | 0 | 0 | 0 |
| Additional Water | 0 | 0 | 0 | 38 |
| Temperature of curing stage 1: up to 60° C. @ a heating rate of 10° C./min. | | yes | | no |
| Temperature of curing stage 1: up to 80° C. @ a heating rate of 10° C./min | | no | | yes |
| Temperature of curing stage 2: up to 150° C. @ a heating rate of 10° C./min. | | yes | | no |
| Temperature of curing stage 2: up to 450° C. @ a heating rate of 10° C./min. | | no | | yes |

CE-A was a commercial roofing granule, obtained under the trade designation "3M CLASSIC ROOFING GRANULES W9300" from 3M Company, St. Paul, Minn.

Figure 1A:
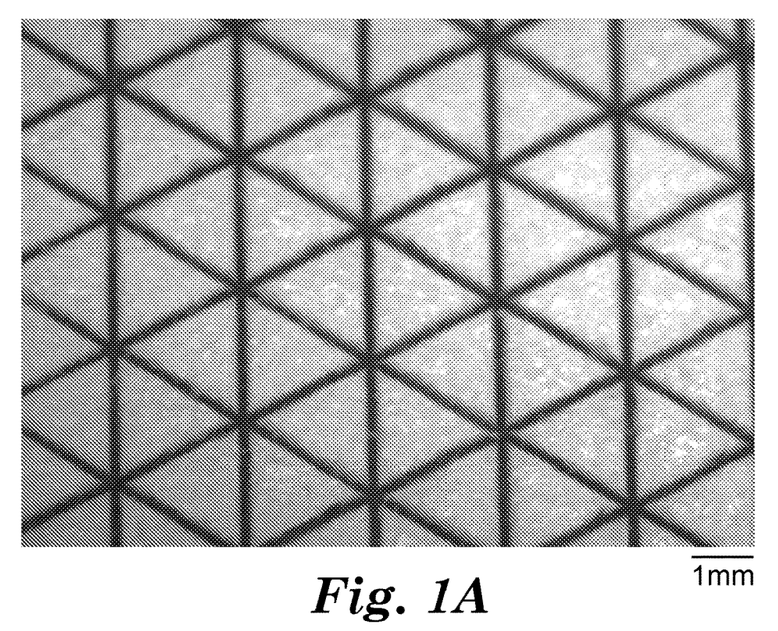
FIGS. 1A-B are optical microscope digital graphs of EX2.
Figure 1B:
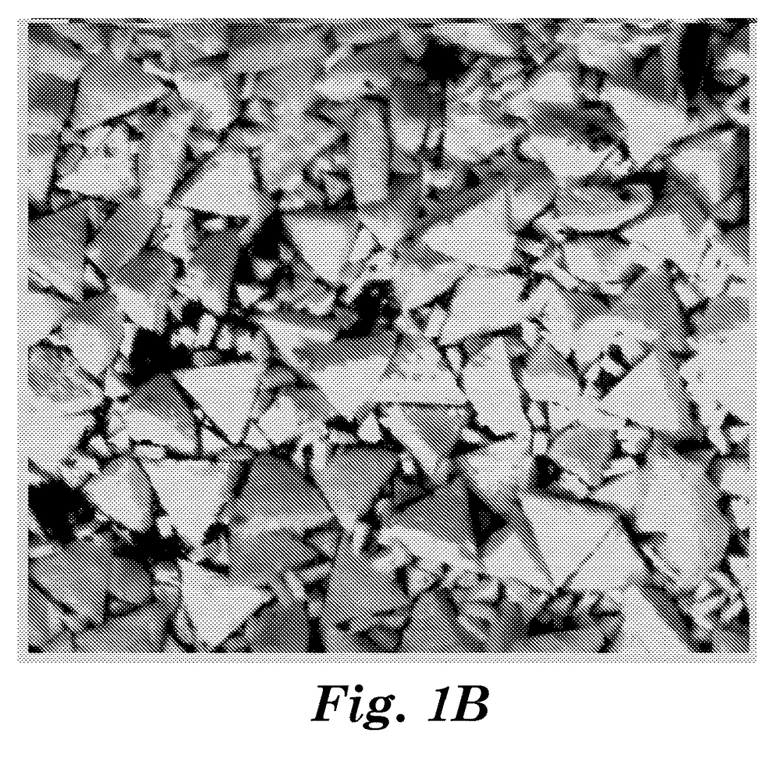
Figure 1C:
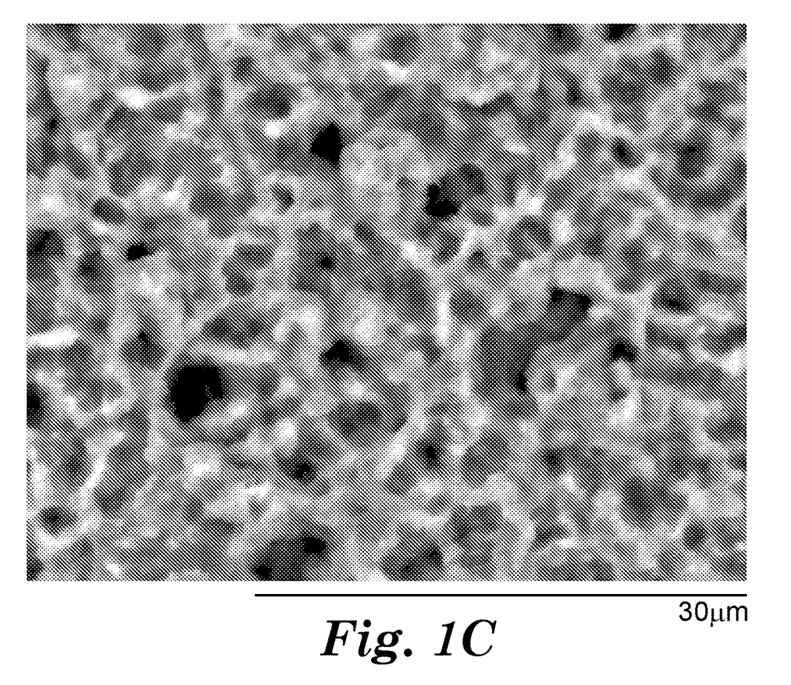
FIGS. 1C-1D are scanning electron microscope (SEM) digital photomicrographs of EX2.
Figure 1D:
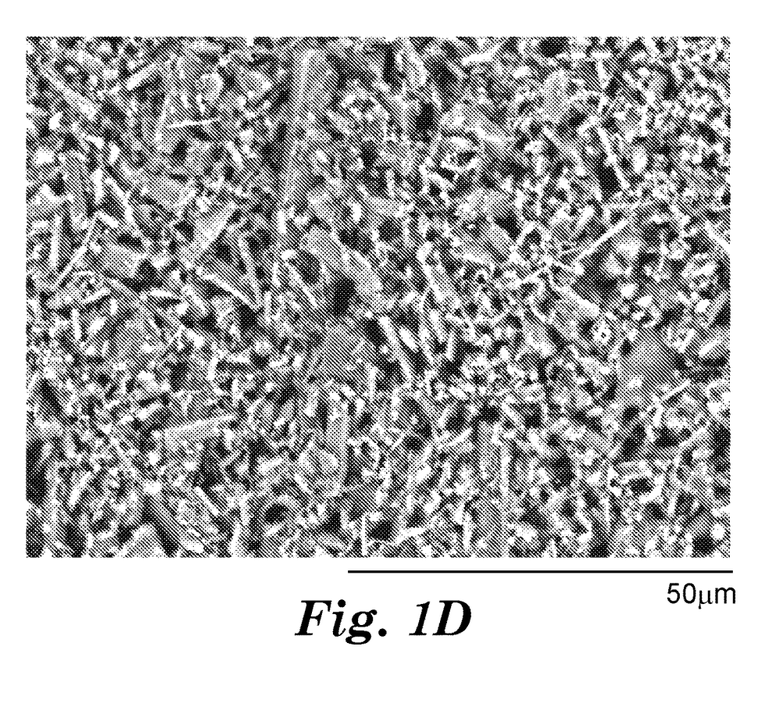

FIGS. 1A-B are optical microscope digital graphs, and FIGS. 1C-1D are scanning electron microscope (SEM) digital graphs of EX2.

EX1-EX4 were characterized using Method For Determining Reflectivity, Method For Determining Granule Tumble Toughness, Method For Stain Resistance Test, Powder X-Ray Diffraction and Brunauer, Emmett and Teller (BET) methods described above. The results are summarized in Table 3, below.

TABLE 3

| | Example | | | | |
|---|---|---|---|---|---|
| Property | EX1 | EX2 | EX3 | CE-A | EX4 |
| Tumble toughness before immersion in water/after immersion in water, wt. % | 99.6/55.0 | 99.8/80.1 | 98.9/70.1 | 99.7/97.01 | 99.6/65.0 |
| Cup reflectivity (solar spectrum) | 0.75 | 0.75 | 0.72 | 0.30 | 0.82 |
| Stain Value, $\Delta E^*$ | 0.30 | 0.27 | 2.54 | 0.65 | 6.5 |
| Pycnometric density (g/cm$^3$) | 2.66 | 2.66 | 2.50 | 2.6-2.75 | 2.6-2.75 |
| Total pore volume cm$^3$/g mean pore diameter Dp (nm) by $N_2$ sorption | 0.21/100 | 0.17/30 | 0.5/500 | 0.03/12 | 0.05/15 |

X-ray diffraction (XRD) patterns (not shown) revealed no new crystalline phase in the final product, and only the phases corresponding to the components of the engineered filler and pigments were registered. An amorphous hump located between 20 and 40 degrees 2-theta indicated disordered structure of siliceous binding network.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A plurality of granules comprising ceramic particles bound together with an inorganic binder, the inorganic binder comprising reaction product of at least alkali silicate and hardener, wherein the ceramic particles are present as at least 50 percent by weight of each granule, based on the total weight of the respective granule, wherein each granule has a total porosity in a range from greater than 20 to 50 percent by volume, based on the total volume of the respective granule, wherein each granule has a mean pore diameter less than 500 nanometers, wherein the granules are free of clay, and wherein the granule has a minimum Total Solar Reflectance of at least 0.70.

2. The plurality of granules of claim 1, wherein the granule has a minimum Total Solar Reflectance of at least 0.75.

3. The plurality of granules of claim 1, wherein the granule has a minimum Total Solar Reflectance of at least 0.80.

4. The plurality of granules of claim 1, wherein each granule collectively comprises at least 80 percent by weight collectively of the ceramic particles and reaction product of the alkali silicate and the hardener, based on the total weight of the respective granule.

5. The plurality of granules of claim 1, wherein the ceramic particles each have a longest dimension, wherein the granules each have a longest dimension, and wherein the longest dimension of each ceramic particle for a given granule is no greater than 20% of the diameter of said given granule.

6. The plurality of granules of claim 1, wherein the ceramic particles of each granule comprises no more than 10 percent by weight, on a theoretical oxides basis, $TiO_2$, based on the total weight of the granule for the respective granule.

7. The plurality of granules of claim 1, wherein the ceramic particles of each granule comprises no more than 10 percent by weight pure $TiO_2$, based on the total weight of the granule for the respective granule.

8. The plurality of granules of claim 1, wherein the ceramic particles of each granule comprises no more than 10 percent by weight pure $Al_2O_3$, based on the total weight of the granule for the respective granule.

9. The plurality of granules of claim 1, wherein the granules have a Tumble Toughness Value of at least 70.

10. The plurality of granules of claim 1, wherein the granules have a Tumble Toughness Value, after 2 month immersion in water at 20° C.±2° C., of at least 35.

11. The plurality of granules of claim 1, wherein the inorganic binder is present as at least 5 percent by weight of each granule, based on the total weight of the respective granule.

12. The plurality of granules of claim 1, wherein the granules have particle sizes in a range from 25 micrometers to 5 millimeters.

13. The plurality of granules of claim 1, wherein the ceramic particles have an average particle size in a range from 200 nanometers to 200 micrometers.

14. The plurality of granules of claim 1, wherein the inorganic binder is amorphous.

15. The plurality of granules of claim 1, wherein the inorganic binder is partially crystallized.

16. The plurality of granules of claim 1, wherein the alkali silicate is at least one of a cesium silicate, a lithium silicate, a potassium silicate, or a sodium silicate.

17. The plurality of granules of claim 1, wherein the hardener is amorphous.

18. The plurality of granules of claim 1, wherein the hardener is at least one of an aluminum phosphate, an amorphous aluminosilicate, a fluorosilicate, Portland cement, or a calcium silicate.

19. The plurality of granules of claim 1, wherein the hardener is at least one of an aluminum phosphate, an aluminosilicate, a fluorosilicate, Portland cement, a cryolite, a calcium salt, or a calcium silicate.

20. The plurality of granules of claim 1, wherein the ceramic particles comprise at least one of aluminum hydroxide, metal oxide, metalloid oxide, soda-lime-silica glass, borosilicate glass, porcelain, or marble.

21. The plurality of granules of claim 1, wherein the ceramic particles comprise a mineral.

22. The plurality of granules of claim 1, wherein the granules further comprise at least one of a functional additive, organic binder, or pigment.

23. The plurality of granules of claim 1, wherein the granules have a Stain Value not greater than 15.

24. A roofing material comprising a substrate and granules of claim 1, wherein the roofing material has a total solar reflectance of at least 0.7.

* * * * *